(12) United States Patent
McFarland et al.

(10) Patent No.: US 10,254,414 B2
(45) Date of Patent: Apr. 9, 2019

(54) GLOBAL NAVIGATION SATELLITE SYSTEM VEHICLE POSITION AUGMENTATION UTILIZING MAP ENHANCED DEAD RECKONING

(71) Applicant: Veoneer US Inc., Southfield, MI (US)

(72) Inventors: Daniel McFarland, Holden, MA (US); Jens Nitzschke, Northbook, IL (US)

(73) Assignee: VEONEER US INC., Southfield, MI (US)

(*) Notice: Subject to any disclaimer, the term of this patent is extended or adjusted under 35 U.S.C. 154(b) by 56 days.

(21) Appl. No.: 15/484,341

(22) Filed: Apr. 11, 2017

(65) Prior Publication Data

US 2018/0292543 A1 Oct. 11, 2018

(51) Int. Cl.
*G01S 19/49* (2010.01)
*G01C 21/16* (2006.01)
*G01S 19/51* (2010.01)

(52) U.S. Cl.
CPC ............ *G01S 19/49* (2013.01); *G01C 21/165* (2013.01); *G01S 19/51* (2013.01)

(58) Field of Classification Search
CPC ........ G01S 19/49; G01S 19/51; G01C 21/165
See application file for complete search history.

(56) References Cited

U.S. PATENT DOCUMENTS

| | | | |
|---|---|---|---|
| 6,272,349 B1 | 8/2001 | McGrath et al. | 455/456.3 |
| 8,611,953 B2 | 12/2013 | Jordan et al. | 455/556.1 |
| 8,996,197 B2 | 3/2015 | Joh et al. | 701/1 |
| 2011/0257882 A1 | 10/2011 | McBurney et al. | 701/208 |
| 2012/0245817 A1 | 9/2012 | Cooprider et al. | 701/70 |

FOREIGN PATENT DOCUMENTS

| | | | | |
|---|---|---|---|---|
| EP | 2541198 A1 | 6/2011 | | G01C 21/30 |
| WO | WO 2009/098154 | 1/2009 | | G01C 21/30 |
| WO | WO2014/149043 A1 | 3/2013 | | G06F 19/00 |

*Primary Examiner* — Basil T. Jos
(74) *Attorney, Agent, or Firm* — Christopher P. Maiorana, PC

(57) ABSTRACT

A method of enhancing global navigation satellite system performance includes the steps of (A) determining position information based upon (i) global navigation satellite system information, (ii) dead reckoning using one or more sensor inputs, and (iii) a correction signal, (B) when the global navigation satellite system information is unavailable, adjusting the position information and generating the correction signal based upon pre-defined map data, and (C) when the global navigation satellite system information is reacquired after being unavailable, suspending the dead reckoning for a predefined amount of time.

20 Claims, 9 Drawing Sheets

GLOBAL NAVIGATION SATELLITE SYSTEM VEHICLE POSITION AUGMENTATION UTILIZING MAP ENHANCED DEAD RECKONING

FIELD OF THE INVENTION

The invention relates to vehicle position determination generally and, more particularly, to a method and/or apparatus for implementing a global navigation satellite system (GNSS) vehicle position augmentation utilizing map enhanced dead reckoning.

BACKGROUND

Global navigation satellite system (GNSS) and global positioning satellite (GPS) receivers use satellite signals to determine an absolute position location. GNSS and GPS receivers including dead-reckoning (DR) capability also rely on sensor inputs to derive a relative dead-reckoned position for times when the satellite signals are not available. The relative dead-reckoned position compounds accumulated sensor errors, and eventually becomes unusable. The compounded errors can be minimized by using map data to augment the global navigation satellite system (GNSS) vehicle position. However, when emerging from a tunnel, for example, and satellite signals are again available, transitioning back to using satellites with dead reckoning can be problematic. Conventional systems can be slow to correct themselves when satellites are recovered due to the reliance on DR input.

It would be desirable to implement global navigation satellite system (GNSS) vehicle position augmentation utilizing map enhanced dead reckoning.

SUMMARY

The invention concerns a method of enhancing global navigation satellite system performance including the steps of (A) determining position information based upon (i) global navigation satellite system information, (ii) dead reckoning using one or more sensor inputs, and (iii) a correction signal, (B) when the global navigation satellite system information is unavailable, adjusting the position information and generating the correction signal based upon pre-defined map data, and (C) when the global navigation satellite system information is reacquired after being unavailable, suspending the dead reckoning for a predefined amount of time.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
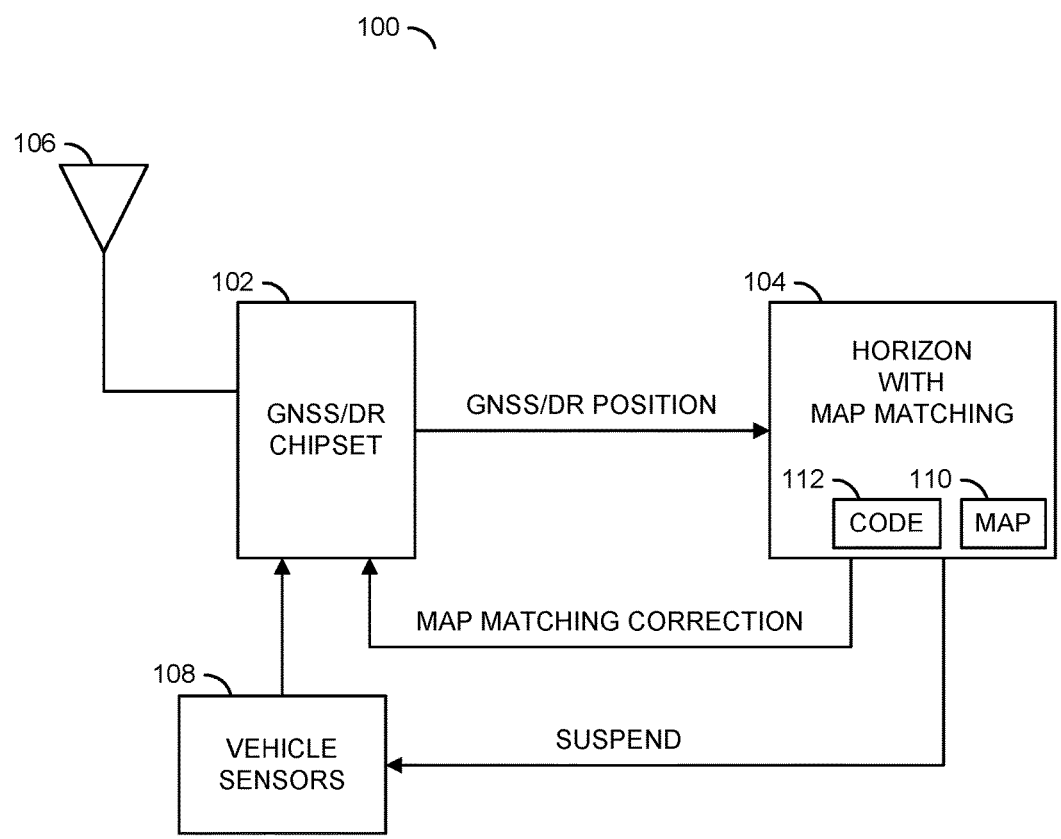
FIG. 1 is a diagram illustrating an example vehicle positioning system in accordance with an example embodiment.

Embodiments of the present invention include providing global navigation satellite system (GNSS) vehicle position augmentation utilizing map enhanced dead reckoning that may (i) suspend sensor input to a GNSS/GPS/DR module during (or following) reacquisition of satellite signals, (ii) force a quicker receiver recovery, (iii) force a GNSS/GPS/DR module to rely mainly on satellite information, (iv) force a GNSS/GPS/DR module to correct accumulated longitudinal error upon reacquisition of satellite signals, (v) extend dead reckoning, (vi) temporarily suspend utilization of motion and/or inertial sensor inputs in dead reckoning calculations, and/or (vii) be implemented as one or more integrated circuits.

A global navigation satellite system (GNSS) or global positioning system (GPS) uses signals from multiple (e.g., 4 or more) satellites to derive (compute) an absolute global position. GNSS is a superset of GPS. It will be apparent to an ordinarily skilled artisan in the field of satellite-based navigation and/or positioning systems (e.g., global navigation satellite system (GNSS), global positioning system (GPS), etc.) that the terms GNSS, GPS, and GNSS/GPS may be used interchangeably with respect to various embodiments of the invention without affecting the intended scope of the invention.

The GNSS systems work very nicely as long as enough satellites are available (e.g., electronically visible). GNSS systems can be used in personal navigation devices (e.g., handheld unit, cell phone, etc.) and in vehicles (e.g., to track the vehicle, assist drivers, etc.). However, when a vehicle enters a tunnel, garage, or other area that limits the electronic visibility of enough satellites, the satellite signals become unavailable and the GNSS system is no longer able to accurately calculate the absolute global position using the satellites.

A technique referred to as dead reckoning or dead-reckoning or deduced reckoning (DR) was introduced to augment GNSS satellite based positioning. When signals from enough satellites are blocked or otherwise not available, a GNSS/DR system may use dead reckoning to determine (calculate) a current (inertial) position relative to a last known absolute position using, for example, measurements from one or more sensor inputs (e.g., motion sensor, inertial measurement unit (IMU), vehicle speed sensor (VSS), odometer ticks sensor, wheel ticks sensor, gyroscope, magnetometer, accelerometer, steering wheel rotation sensor, etc.). The one or more sensors may be part of the GNSS/DR module (e.g., integrated gyro, magnetometer, and/or accelerometer) and/or part of the vehicle. In embodiments where motion and/or inertial measurement sensors are part of the vehicle, the motion and/or inertial measurement sensors may be accessible through a vehicle communication/data bus (e.g., messages on a Controller Area Network (CAN), etc.).

In general, GNSS information may be considered available when the calculated position is within an acceptable tolerance (e.g., the positional accuracy of the location information calculated from the signals received from the GNSS satellites passes a quality check). When the location information calculated from the GNSS satellite signals is not within the acceptable tolerance, or when no GNSS satellite signals are available, the GNSS information may be considered unavailable. The GNSS information may be considered to remain unavailable until such time as the accuracy of the GNSS information returns to within the acceptable tolerance (e.g., when a sufficient number and quality of satellite signals are received from the GNSS satellites to pass the quality check). Examples of ways in which satellite signals may be affected by local terrain may be found in co-pending U.S. application Ser. No. 15/078,514, filed Mar. 23, 2016, entitled "AUTOMOTIVE DEAD RECKONING WITH DYNAMIC CALIBRATION AND/OR DYNAMIC WEIGHTING," and which is hereby incorporated by reference in its entirety.

Dead reckoning works well for short distances. However, for longer distances accumulated errors in the sensor data eventually leads to position offsets that corrupt the reported position. Because accumulated sensor offsets eventually render the relative position unusable, conventional dead reckoning is limited. The limited usability of conventional dead reckoning creates an acute problem for applications where the vehicle travels in an area with limited electronic sight of enough satellites (e.g., through a tunnel that extends for several miles, passes through a mountain, or passes under a bay; within a garage; etc.).

In various embodiments, a map comparison (or map matching) technique may be implemented to augment the dead-reckoned vehicle position. In an example, when satellite signals are unavailable a map comparison module may (i) receive the dead-reckoned vehicle position from the GNSS/DR module, (ii) adjust the dead-reckoned vehicle position to a centerline of a corresponding road segment at the current position using a map database, and (iii) feed the adjusted (corrected) position (or a correction signal) back to the GNSS/DR module, reducing or eliminating DR lateral position error. The position may be held to the road centerline for the entire drive. When the satellite signals are again available (e.g., satellite signals are reacquired), the positioning may return to a blended GNSS/DR solution and the closed loop map matching feedback may be suspended. By augmenting the GNSS/DR positioning using the map matching feedback, accumulated lateral position errors can be virtually eliminated for extended durations. This method may greatly improve vehicle positioning in long tunnels that extend for many miles.

In various embodiments of an electronic horizon device in accordance with the invention, a road map (e.g., of an entire region or limited to areas such as tunnels where satellite signals are unavailable) is incorporated into the system. By using a "map matching" algorithm, the horizon device is able to compare the GNSS reported position with the most likely real position, given the assumption that the vehicle is restricted to a roadway. In various embodiments, software may be used to make the comparison and generate a corrected position, which is then reported back to the GNSS/DR module. The GNSS/DR module uses the corrected position to adjust the reported position accordingly. In various embodiments, the map matching feedback to the GNSS/DR module is only initiated when the GNSS/DR module reports a DR-only position (e.g., no satellites are available).

However, if the road segments selected during map matching are not correct, or the motion and/or inertial sensor error is high enough, an absolute position determined when satellite signals are reacquired can vary from a current inertial position. Conventional GNSS/DR systems can be slow to reconcile differences between the inertial position computed when satellite signals are unavailable and a new absolute position computed when satellite signals are reacquired. The compounded errors can be minimized by using map data to augment the GNSS vehicle position. However, when emerging from a tunnel, for example, and satellite signals are again available, transitioning back to using satellites with dead reckoning can be problematic. Specifically, the conventional systems can be slow to correct themselves when satellites are recovered due to the reliance on DR input.

When the GNSS/DR module in accordance with an embodiment of the invention reports satellites signals are again available, the GNSS/DR module may be forced to make a satellite only position determination. Forcing the GNSS/DR module to make a satellite only position determination upon reacquiring the satellite signals is desirable because while the map matching feedback corrects for lateral errors (left to right), the map matching feedback generally does not correct for accumulated longitudinal errors (front to back).

In various embodiments, once reception of the satellite signals resumes, the system may suspend utilization of vehicle and/or integrated sensor feedback by the GNSS/DR module momentarily, to force the GNSS/DR module to rely only on the satellite signals for position calculation and to flush any "relative" DR position being maintained. The momentary suspension of vehicle and/or integrated sensor feedback utilization forces the GNSS/DR module to correct any accumulated longitudinal error once the satellites are available.

Referring to FIG. 1, a block diagram of a system 100 is shown illustrating an example vehicle positioning system in accordance with an example embodiment of the invention. In an example, the system 100 may comprise a block (or circuit) 102, a block (or circuit) 104, a block (or circuit) 106, and a block (or circuit) 108. The block 102 may be implemented as a GNSS chipset. The block 104 may be implemented as an electronic horizon with map matching circuit. The block 106 may be implemented as a GNSS antenna. The block 108 may be implemented as one or more vehicle sensors. The vehicle sensors may include motion and/or inertial sensors. Although the invention is described using an example of a vehicle based embodiment, it will be apparent that the invention may also be applied in the context of a handheld personal navigation device. In the handheld personal navigation device the block 108 would be implemented as one or more integrated motion and/or inertial sensors.

The block 102 may be configured to generate (calculate) position information of a vehicle using (i) global navigation satellite system information associated with signals received from a plurality of satellites via the antenna 106, (ii) a map matching correction signal received from the block 104, and (iii) sensor data received from the block 108. The block 102 may be configured to communicate the calculated vehicle position to the block 104 via a position signal (e.g., GNSS/DR POSITION). The position information communicated to the block 104 may also comprise a source indication (e.g., GNSS only, GNSS plus dead reckoning (DR) and/or DR-only indicators or flags).

The block 104 may be configured to receive the position signal GNSS/DR POSITION and calculate a correction factor based on a map matching operation using the vehicle position specified by the signal GNSS/DR POSITION and pre-defined digital map data stored, for example, in a map database 110. In an example, the block 104 may be configured by software (or firmware) stored in a processor readable storage medium (e.g., memory) 112. In an example, the block 104 may be configured to locate the position of the vehicle on an electronic map using the vehicle position specified by the signal GNSS/DR POSITION and then calculate a correction factor for shifting (adjusting) a lateral position of the vehicle according to a centerline of a road segment corresponding to the position specified by the signal GNSS/DR position based upon the map data 110. The correction information may be communicated from the block 104 to the block 102 via a correction signal (e.g., MAP MATCHING CORRECTION). The block 102 may utilize the correction information communicated by the signal MAP MATCHING CORRECTION to adjust (correct) future relative position information communicated to the block 104.

The block 104 may be further configured to generate (assert) a signal (e.g., SUSPEND) in response to detecting that the position information in the signal GNSS/DR POSITION is satellite based after a period of time when the position information in the signal GNSS/DR POSITION was not satellite based (e.g., DR-only position information). The signal SUSPEND may implement a control signal. In various embodiments, the signal SUSPEND may be used to inhibit dead reckoning using the one or more motion and/or inertial sensors 108 of the vehicle.

In various embodiments, the signal SUSPEND may be asserted by the block 104 to suspend (inhibit) communication of the vehicle sensor data 108 to the block 102. When the vehicle sensor data 108 is prevented from being communicated to the block 102, the block 102 is generally forced to rely on only the reacquired satellite signals to generate the position information contained in the signal GNSS/DR POSITION. Suspending communication of the vehicle sensor data 108 to the block 102 may also force the block 102 to cancel the relative positioning error that may have accumulated within the dead reckoning position information.

In some embodiments, the block 104 does not generate the signal SUSPEND. Instead, the block 102 may be configured to momentarily inhibit use of the vehicle sensor data 108 received by the block 102 when the GNSS satellite signals become available after a period of being unavailable. In some embodiments, the block 102 may include one or more integrated inertial sensors (e.g., integrated gyro, magnetometer, and/or accelerometer). In embodiments where the block 102 includes one or more integrated inertial sensors, the block 102 may also be configured to momentarily suspend use of inputs from the integrated inertial sensors as well, in order to force the block 102 to cancel any relative positioning error that may have accumulated within the dead reckoned position information.

The block 108 may be configured to generate a number of motion and/or inertial measurements that may be used by the block 102 to calculate the vehicle position using dead reckoning (DR) when satellite signals from the antenna 106 are lost or otherwise unavailable (e.g., in a tunnel, garage, etc.). The vehicle sensors and/or measurements may include, but are not limited to vehicle speed sensor (VSS), odometer ticks sensor, wheel ticks sensor, gyroscope, magnetometer, accelerometer, and/or steering wheel rotation sensor. In embodiments implementing the signal SUSPEND, the block 108 may have an input that may receive the signal SUSPEND. In various embodiments, the block 108 may determine when sensor data is sent to the block 102 based upon a state (e.g., asserted/not asserted) of the signal SUSPEND. In an example, when the signal SUSPEND is asserted, the block 108 may stop communicating sensor data to the block 102 and when the signal SUSPEND is de-asserted the block 108 may resume communicating sensor data to the block 102.

When satellite signals from the antenna 106 are unavailable, the block 102 may begin generating dead-reckoning (DR) only position data for transmission to the block 104. The block 102 may indicate to the block 104 that the position information is DR-only position information. Once the satellite signals are reacquired (available), the block 102 may indicate to the block 104 whether the position data is GNSS-only or a combination of GNSS and DR information. Once the satellite signals are reacquired by the block 102 and the position data is indicated as being a combination of GNSS and DR information, the block 104 may assert the signal SUSPEND (if implemented) to temporarily prevent vehicle sensor data 108 from being transmitted to the block 102. In response to the loss of the vehicle sensor data 108, the block 102 is forced to rely only on the satellite signals from the antenna 106 and, therefore, adjusting the position data transmitted to the block 104 to reflect only the position calculated from the satellite data which also forces the block 102 to cancel any relative positioning error that may have accumulated within the dead reckoned position information.

Figure 2:
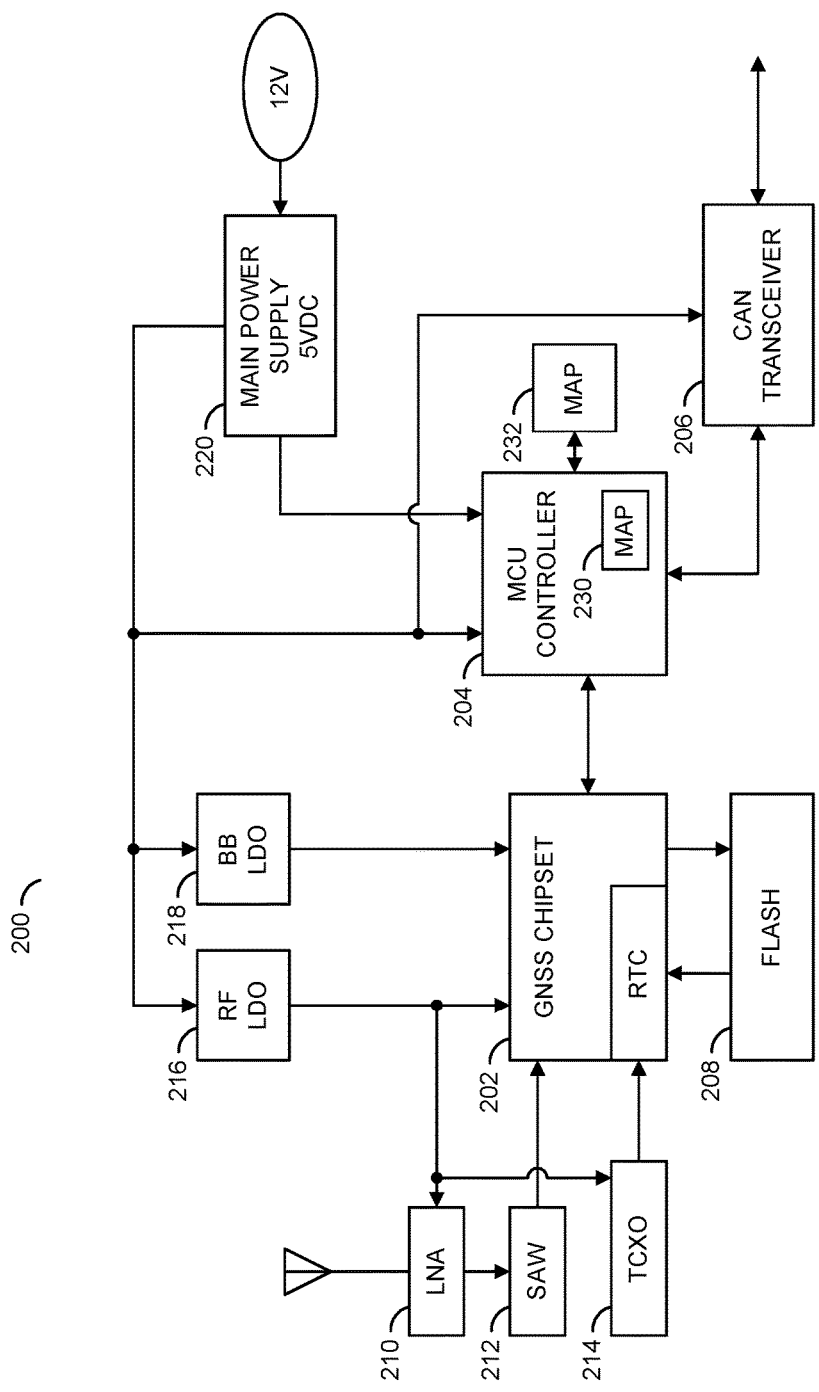
FIG. 2 is a diagram illustrating another vehicle positioning system in accordance with an example embodiment.

Referring to FIG. 2, a diagram of a system 200 is shown illustrating another vehicle positioning system in accordance with an example embodiment of the invention. In an example, the system 200 may comprise a block (or circuit) 202, a block (or circuit) 204, a block (or circuit) 206, a block (or circuit) 208, a block (or circuit) 210, a block (or circuit) 212, a block (or circuit) 214, a block (or circuit) 216, a block (or circuit) 218, and a block (or circuit) 220. The block 202 may be implemented as a GNSS chipset. The block 204 may be implemented as a microcontroller or processor configured (programmed) as an electronic horizon with map matching circuit. The block 206 may be implemented as a controller area network (CAN) transceiver. The block 208 may be implemented as a nonvolatile memory (e.g., Flash, etc.). The block 210 may be implemented as low noise amplifier (LNA). The block 212 may be implemented as a surface wave acoustic (SAW) filter. The block 214 may be implemented as a clock oscillator for providing a time reference to a real time clock portion of the block 202. The block 216 may be implemented as low dropout (LDO) voltage regulator for a radio frequency (RF) portion of the block 202. The block 218 may be implemented as a low dropout (LDO) voltage regulator for a baseband (BB) portion of the block 202. The block 220 may be implemented as a main power supply configured to provide one or more regulated supplies using the vehicle battery. In some embodiments, the block 204 may include internal storage 230 configured to store map data for map matching operations. In some embodiments, the block 204 may be interfaced with an external storage device 232 configured to store map data for map matching operations. The block 204 may be programmed using software or firmware stored in the internal storage 230 of the block 204.

In some embodiments, the GNSS chipset 202 may be configured to perform dead reckoning (DR) using vehicle sensor data. The vehicle sensor data may be communicated from the vehicle CAN bus to the GNSS chipset 202 by the controller 204 and the CAN transceiver 206. In embodiments implementing DR in the GNSS chipset 202, the controller 204 may suspend the DR operations by not passing the vehicle sensor data from the vehicle CAN bus to the GNSS chipset 202 or sending a command (e.g., the signal SUSPEND) to the GNSS chipset 202 to momentarily suspend utilizing the vehicle sensor data for DR calculations.

In some embodiments, the GNSS chipset 202 may be configured to perform only the GNSS position computations and the controller 204 may be configured to perform the dead reckoning (DR) operations using the vehicle sensor data obtained from the vehicle CAN bus by the CAN transceiver 206. In embodiments implementing the DR operations in the controller 204, the controller 204 may suspend the DR operations by not requesting (or obtaining) the vehicle sensor data from the vehicle CAN bus.

The system 200 may implement a self-contained electronic control unit (ECU) that resides on the vehicle CAN bus. The system 200 may gather information from other sensors in the vehicle and publish GNSS information on the CAN bus that can be used in multiple systems throughout the vehicle. The system 200 may include a GNSS antenna that is optimized for in-car performance and a module that can be mounted discretely in the instrument panel, on the windscreen, or in a rear package tray of the vehicle. Providing a location that is far forward (rearward if using the rear package tray), close to the lateral centerline and as high as possible in the instrument panel (or package tray) generally allows the unit to capture a full complement of satellites for an accurate solution set.

The system 200 may also include integrated power management, allowing the system 200 to be connected directly, or via a fuse, to raw battery power. The microprocessor 204 and CAN transceiver 206 allow communication from the CAN bus to the GNSS chipset 202 and from the GNSS chipset 202 to other electronic control units (ECUs) on the CAN bus.

The system 200 resides on the CAN bus and collects messages in order to calibrate and process Dead Reckoning (DR) position information. In an example, the messages may include: IGNITION STATE, PRNDL, 2 or 4 wheel click, and gyro. The CAN microcontroller 206 decodes the messages and sends consistent data to the GNSS chipset 202 and/or the controller 204 in order for the GNSS chipset 202 and/or the controller 204 to process a calibration against the sensors to enable DR. In various embodiments, the system 200 may be capable of both wheel click/gyro and 4 wheel DR modes, with wheel click/gyro being the preferred and generally more accurate mode.

The sensor data is generally calibrated against the GNSS solution, and once established, is used to provide enhanced positioning. In cases of tunnels and parking garages, the absence of satellite coverage would make navigation impossible for any GNSS only solution. The system 200 may navigate through these conditions using the sensor information provided by the vehicle and the map data 230 or 232. In the case of urban canyons, multi-path signals of GNSS satellites can lead to highly inaccurate solutions that are difficult to map match. By fusing GNSS and sensor information, the system 200 may navigate with significantly better accuracy in dense urban canyons.

Additionally, the system 200 may include a predicted ephemeris algorithm. The predicted ephemeris algorithm allows the system 200 to begin navigating quickly after being in a long tunnel or after start-up even after being off for 2 hours or more. Without the predicted ephemeris algorithm, the system 200 would need to secure a strong satellite signal level and download a current ephemeris table. With predicted ephemeris, the GNSS chipset 202 may quickly calculate a predicted table and begin navigation while a table is being downloaded.

In some embodiments, a driver assistance system program (or code) may also be stored in the internal memory 230 of the controller 204. The driver assistance system code may include a map matching module (routine). The map matching module may include a map matching algorithm that receives vehicle location data (e.g., latitude, longitude, elevation, etc.) from the GNSS chipset 202. In various embodiments, the vehicle location data is enhanced and made more accurate by combining the GNSS vehicle location data with vehicle sensor data from at least one vehicle sensor accessible through the CAN bus. For example, The controller 204 may use the map information in either the block 230 or the block 232 and the position information from the GNSS chipset 202 to determine that the vehicle is located at a series of longitude and latitude coordinates within an area on a bidirectional two lane highway specified in the map information.

Figure 7:
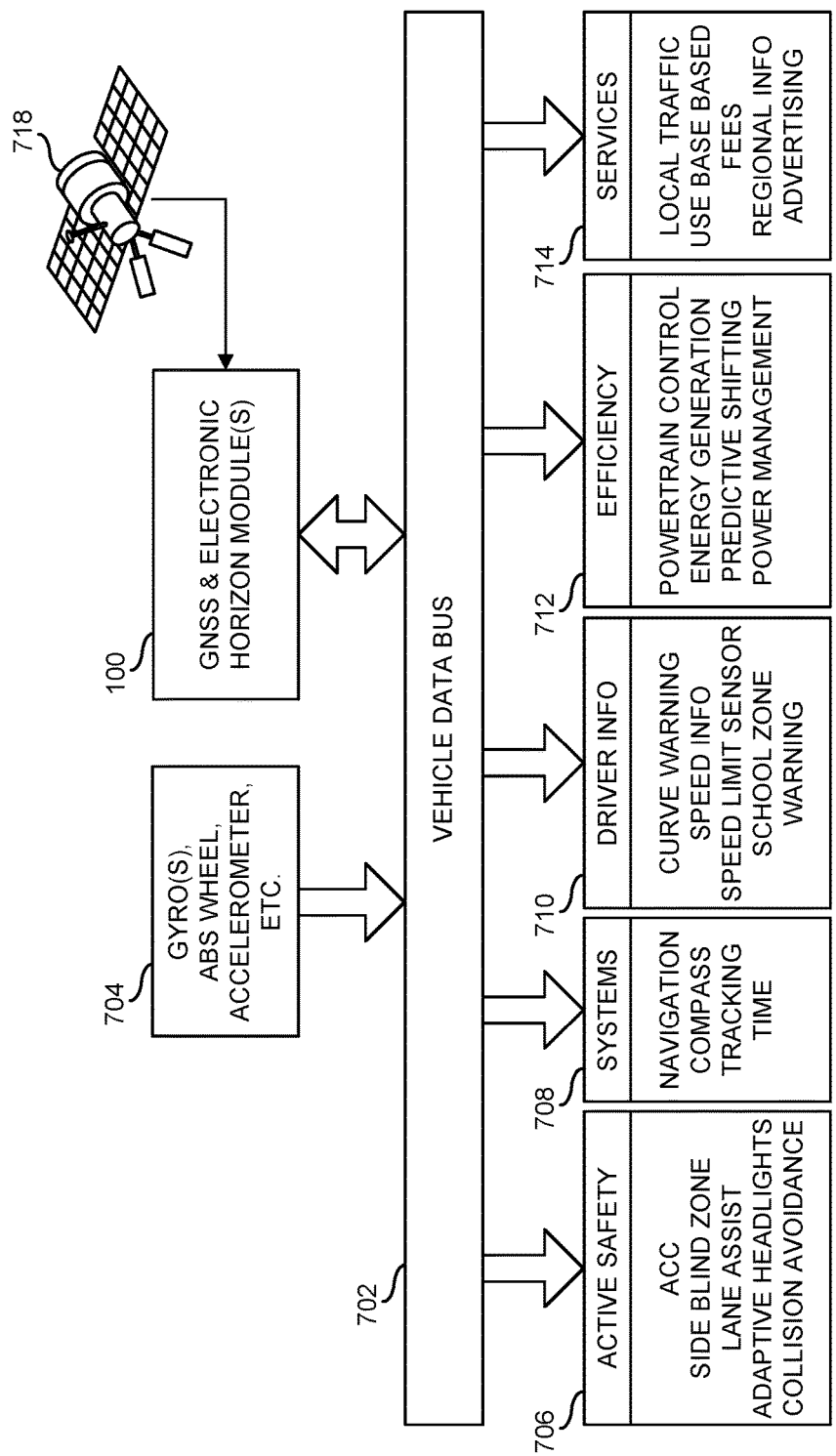
FIG. 7 is a diagram illustrating applications supported by the system of FIG. 1.

In various embodiments, when the controller 204 has determined an enhanced location of the vehicle, the enhanced vehicle location may be used with a map matching algorithm. The map matching algorithm may use the enhanced location of the vehicle or raw location data from the GNSS chipset 202 to extract navigation characteristics associated with the vehicle location in the map data contained in the block 230 or the block 232. The navigation characteristics extracted from map data may be used for a variety of applications to add to or enhance active or passive electronic safety systems of the vehicle. The application programs may be executed alone (e.g., only used with the map data). The application programs may also be executed in connection with a variety of vehicle sensors to add further functionality. Examples of various application programs are illustrated in FIG. 7.

Map data stored in the block 230 or the block 232 may include most of the roads in the country, making it theoretically possible to determine placement of the vehicle. Geometric and attribute information about the road at the matching coordinates for the vehicle may be looked up from the map data in the blocks 230 and 232. The collection of the road information around the vehicle may be referred to as an electronic horizon. In a typical electronic horizon system, roads are composed of many road segments (referred to as links) for which the road geometric and attribute information is defined. The geometric information of a road segment may include, but is not limited to longitude, latitude, elevation, horizontal curvature, and grade along the road. The road attribute information may also include road signs, number of lanes, road function class (e.g., freeway, ramp, arterial, etc.), lane marking type, paved/unpaved, and divided/undivided. Although the number of lanes may be indicated, the map data typically does not include the coordinates of individual lanes because of the significant increase in the volume of data that would have to be represented. Instead, the links generally include a one-dimensional parameter that corresponds with a centerline of the road.

Figure 3:
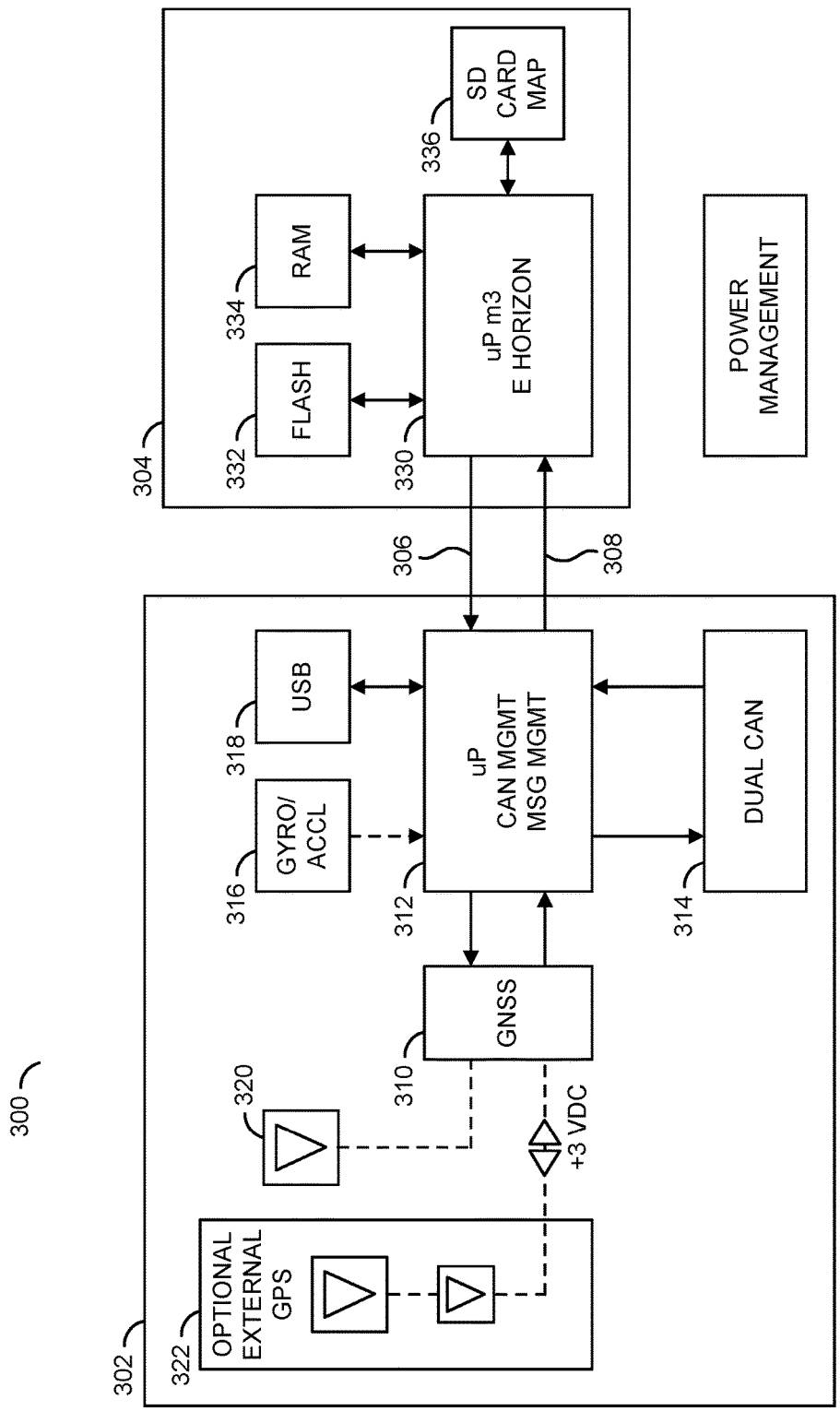
FIG. 3 is a diagram illustrating still another vehicle positioning system in accordance with an example embodiment.

Referring to FIG. 3, a diagram of a system 300 is shown illustrating still another vehicle positioning system in accordance with an example embodiment of the invention. In an example, the system 300 may comprise a block (or circuit) 302 and a block (or circuit) 304. The block 302 may implement a GNSS module. The block 304 may implement an electronic horizon module. The blocks 302 and 304 generally communicate via communication channels (or buses) 306 and 308. In an example, map matching correction information may be communicated to the block 302 via the channel 306 and vehicle position information may be communicated to the block 304 via the channel 308. The channels 306 and 308 may be implemented as wired or wireless connections.

In an example, the block 302 may comprise a block (or circuit) 310, a block (or circuit) 312, a block (or circuit) 314, a block (or circuit) 316, a block (or circuit) 318, a block (or circuit) 320, and a block (or circuit) 322. The block 310 may be implemented as a GNSS chipset. The block 312 may be implemented as a CAN management microcontroller (MCU). The block 314 may be implemented as a dual CAN bus transceiver. The block 316 may implement an optional onboard gyroscope/accelerometer module. The block 318 may implement a universal serial bus (USB) interface. The block 320 may implement an integrated GNSS antenna. The block 322 may implement an optional external GNSS antenna and low noise amplifier.

In an example, the block 304 may comprise a block (or circuit) 330, a block (or circuit) 332, a block (or circuit) 334, and a block (or circuit) 336. The block 330 may be implemented as a microcontroller or processor configured (programmed) as an electronic horizon and map matching module. The block 332 may be implemented as a nonvolatile memory (e.g., Flash, etc.). The block 332 may store processor executable code for controlling operation of the block 330. The block 334 may be implemented as random access memory (RAM). The block 336 may be implemented as a removable memory (e.g., secure digital (SD) memory card, etc.) interface. The block 336 may allow easy swapping of regional maps by plugging in memory cards storing the desired map data. The system 300 may also implement power management.

The CAN management MCU 312 in the GNSS module 302 generally communicates with the electronic horizon MCU 330 via the channels 306 and 308. Latitude, longitude, heading, speed and UTC, as calculated by the GNSS chipset 310, may be processed by the CAN MCU 312 and sent to the electronic horizon MCU 330. The electronic horizon MCU 330 may be configured to execute code (e.g., processor executable instructions) for processing the positional information and building a local map in the RAM 334 from the map data in an SD card attached to the SD interface 336. Map matching and centerline correction may be established and map-matching feedback generated from the positional data and the map may be sent back to the CAN MCU 312 via the channel 306. The CAN MCU 312 sends the map-matching feedback (e.g., map matching correction) to the GNSS chipset 310.

When the GNSS chipset 310 implements the DR solutions, the CAN MCU 312 may also be instructed by the MCU 330 to block vehicle sensor data received from the CAN bus from being sent to the GNSS chipset 310. In response to the loss of the vehicle sensor data, the GNSS chipset 310 is forced to rely only on the satellite signals from the antenna 320 or the antenna 322 and, therefore, adjusting the position data transmitted to the block 304 to reflect only the position calculated from the satellite data. The GNSS chipset 310 is also forced to cancel any relative positioning error that may have accumulated within the dead reckoned position information. The CAN MCU 312 builds CAN messages and publishes ADAS data along with the standard GNSS module data to the vehicle data bus via the dual CAN transceiver 314.

Figure 4:
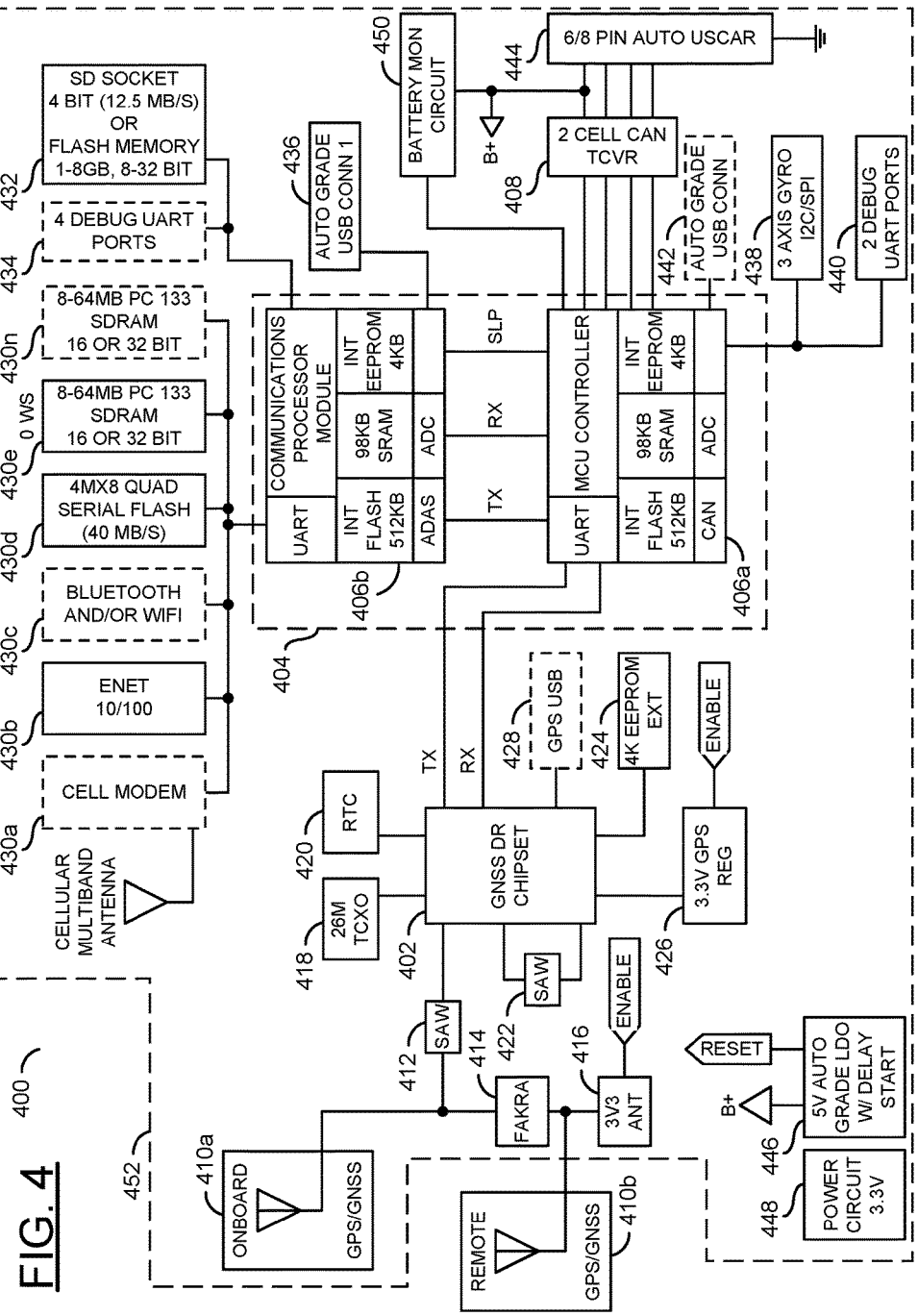
FIG. 4 is a diagram illustrating an example implementation of a vehicle positioning system in accordance with an example embodiment.

Referring to FIG. 4, a block diagram of a system 400 is shown illustrating an example architecture in accordance with an example embodiment of the invention. The system 400 may implement an integrated global navigation satellite system (GNSS) receiver and electronic horizon module in accordance with an embodiment of the invention. The system 400 may comprise a block (or circuit) 402, a block (or circuit) 404, a block (or circuit) 406a, a block (or circuit) 406b, a block (or circuit) 408, a block (or circuit) 410a, a block (or circuit) 410b, a block (or circuit) 412, a block (or circuit) 414, a block (or circuit) 416, a block (or circuit) 418, a block (or circuit) 420, a block (or circuit) 422, a block (or circuit) 424, a block (or circuit) 426, a block (or circuit) 428, a number of blocks (or circuits) 430, a block (or circuit) 432, a block (or circuit) 434, a block (or circuit) 436, a block (or circuit) 438, a block (or circuit) 440, a block (or circuit) 442, a block (or circuit) 444, a block (or circuit) 446, a block (or circuit) 448, and a block (or circuit) 450. Some or all of the blocks 402-450 may be mounted or connected to at least one printed circuit board (PCB) substrate 452.

In various embodiments, the block 402 may be implemented as a global navigation satellite system (GNSS) dead-reckoning (DR) chipset. In an example, the block 402 may comprise an independently certified drop-in module (e.g., U-Blox, Teseo, etc). In various embodiments, a chipset compliant with one or more global navigation satellite systems (GNSSs) used in various countries around the world (e.g., GPS (USA), GLONASS (Russia), Beidou (China), Compass (China), Galileo (Europe), etc.) may be implemented to meet the design criteria of a particular application. The term global navigation satellite system (GNSS) is used generically and is intended to encompass all satellite-aided navigation systems, including the global positioning system (GPS).

The block 404 may be implemented, in one example, as a processor module. In some embodiments, the block 404 may be implemented as a number of processors 406a-406n. In an example, a block 406a may implement a microcontroller (MCU) and a block 406b may implement a communications processor module. The block 408 may be implemented, in one example, as a controller area network (CAN) transceiver.

The block 410a may be implemented as an onboard GNSS antenna. In one example, the block 410a may comprise a printed circuit board substrate mounted GNSS antenna. In one example, the antenna 410a may be implemented as a microstrip patch antenna. The block 410b may be implemented as a remote (e.g., external) GNSS antenna. The block 412 may be implemented as a surface acoustic wave (SAW) filter configured to couple the blocks 410a and 410b to the block 402. The block 410b may be removably connected to the block 412 by a connector 414. The block 416 may implement a low-voltage power circuit for the block 410b. In one example, the block 416 may be implemented as a 3.3V power circuit.

The block 418 may be implemented as a crystal reference frequency oscillator (TCXO) for the block 402. The block 420 may be implemented as a real time clock (RTC) oscillator. The block 420 may include a low drop out (LDO) regulator (not shown). The block 422 may be implemented as a second SAW filter. The block 424 may be implemented as a non-volatile memory. In one example, the block 424 may be implemented external to the block 402. The block 424 may store operating software and/or data for the block 402. In one example, the block 422 may be implemented as an electrically erasable programmable read only memory (EEPROM). However, other types of memory may be implemented accordingly to meet the design criteria of a particular implementation. The block 426 may be implemented as a dual low drop out (LDO) regulator. The block 426 may provide one or more regulated voltages to (i) a RF front end of the block 402 and (ii) a baseband portion of the block 402. The block 428 may be implemented, in one example, as an optional USB interface to the block 402.

The blocks 430a-430n may implement a number of interface and support modules. In one example, the blocks 430a-430n may comprise an optional cellular modem interface 430a, an Ethernet interface (ENET) 430b, an optional interface 430c that provides support for wireless communication (e.g., IEEE 802.15.1 Bluetooth®, near field communication (NFC), IEEE 802.11 (WiFi), etc.), a non-volatile memory (NVM) interface 430d, and a random access memory (RAM) interface 430e. In one example, the cellular modem interface 430a may be configured to connect with an external antenna. In another example, the cellular modem interface 430a may include a cellular multiband antenna disposed on a layer of the printed circuit board substrate used to implement the system 400. A cellular multiband antenna that can be fabricated on a single layer of a printed circuit board substrate 452 is disclosed in commonly owned U.S. Pat. No. 8,611,953, issued Dec. 17, 2013, which is herein incorporated by reference in its entirety. The Ethernet interface 430b may support multiple data rates (e.g., 10, 100, etc.).

The NVM interface 430d may be implemented, for example, to connect one or more serial flash devices to the block 404. In some embodiments, the NVM interface 430d connects a 4MX8 quad serial flash device to the block 404. In one example, the NVM . interface 430d may connect the block 104 to NVM modules storing map data to be used with signals processed by the system 400. The RAM interface 430e may be configured to connect synchronous dynamic random access memory (SDRAM) to the block 404. In one example, the SDRAM may comprise a number (e.g., eight) of zero wait state, 16 or 32 bit memory devices may be connected to the block 404. In some embodiments, the SDRAM may be implemented with 64 MB memory devices. The block 430n may provide for one or more additional interfaces (e.g., memory sockets for additional memory, etc.).

The block 432 may be implemented, in one example, as a memory socket for connecting one or more non-volatile memory devices. In one example, the block 432 may be configured to accept FLASH memory devices (e.g., 8-8 GB, 8-32 bit) and/or memory cards (e.g., SD cards, etc.). In one example, the memory devices may contain map data to be used with signals processed by the system 400. The block 434 may implement one or more optional debug ports. The block 436 may implement a universal serial bus (USB) interface for the block 404. the block 438 may be implemented as an on-board three axis gyroscope module. The block 438 may be connected to the block 406 using a standard interface (e.g., I²C, SPI, etc.). The system 400 may be configured to use signals from the block 438 and/or CAN based messages for dead reckoning operations. The block 440 may implement a number of debug ports for the block 406. The block 442 may implement an optional USB port for the block 406. The block 444 may be implemented, in one example, as an electrical connector capable of connecting to a CAN bus (e.g., a plug-in connector that can be plugged into an electronic system of a vehicle, a wire pigtail connected to the printed circuit board that can be wired into the electronic system of the vehicle, etc.). The block 446 may implement a main power supply for the system 400. In one example, the block 446 may be implemented as a LDO regulator with delay start. The block 448 may implement a low voltage power circuit for the system 400. The block 450 may be implemented as a battery monitoring circuit.

The block 402 may be implemented, in one example, with discrete surface mount devices (SMDs). In one example, the block 402 may be implemented similarly to GPS circuitry described in U.S. Pat. No. 6,272,349, issued Aug. 7, 2001, which is herein incorporated by reference in its entirety. In one example, the block 402 may include a first integrated circuit for converting radio frequency signals from the GNSS antennae 410a and/or 410b into intermediate frequency signals, and a second integrated circuit for performing operations on the intermediate frequency signals to produce GNSS signals that can be communicated to the electronic system of the vehicle. In one example, the GNSS antennae 410a and/or 410b may be configured for receive-only operation of low level GNSS satellite signals. The filter 412 may be implemented, in one example, as a passband filter operating at L1 GPS (e.g., 1575.42±25 MHZ). However, other filters may be implemented depending on the particular GNSS signals and bandwidth implemented. The filter 412 may be configured to attenuate unwanted out-of-band RF signals to the block 402 and periphery circuitry. The block 402 may include a low noise amplifier (LNA) circuit to amplify low level GNSS signals received by the system 400 with a low signal-to-noise ratio (SNR). The block 416 generally provides a crystal controlled reference frequency signal to the block 402. The block 402 generally receives and processes the GNSS signals. The block 424 may provide data storage for last known satellite fixes, module ID storage, etc.

In one example, the block 412 may be optional. For example, depending on the application, the block 412 may be omitted. In one example, the block 402 may be implemented with an internal filter. For example, a GNSS chipset may have an internal amplifier, filter, and automatic gain control already incorporated (e.g., in connection with anti-jamming capabilities). However, the inclusion of anti-jamming capabilities may affect dead reckoning (DR) performance of the GNSS chipset. Dead reckoning generally refers to a process of estimating a current position based upon a previously determined position, or fix, and advancing that position based upon known or estimated speeds (e.g., from sensors within a vehicle) over an elapsed time, and course.

The optional cellular modem interface 430a may be configured as a cellular transceiver for reception and transmission of mobile telephony signals. In one example, the optional cellular modem interface 430a may include an antenna configured for operation with a GSM (Global System for Mobile Communications: originally Groupe Special Mobile) mobile telephony system. The antenna and the cellular modem may support, in one example, GSM cellular telephone and General Packet Radio Service (GPRS) communication protocols. The cellular modem interface 430a may operate with signals in various GSM carrier ranges (e.g., 400/450 MHZ, 850/900 MHZ, 1800/1900 MHZ, etc.). For example, second generation (2G) GSM networks may operate in the 900 or 1800 MHZ bands. In locations where the 900 or 1800 MHZ bands are already allocated (e.g., in the U.S. and Canada), 850 and 1900 MHZ bands may be used.

GSM modem chips need to be licensed in every country in which the part is sold. When implemented, the optional cellular modem interface 430a may comprise a pre-certified (e.g., licensed) drop-in chip to keep costs down. The optional cellular modem interface 430a may be connected to the block 404. In addition to cellular telephony data, the optional cellular modem interface 430a may be configured to communicate assisted GPS (aGPS) related data to the system 400 and transmit GNSS position information (e.g., using a National Marine Electronics Association (NMEA) standard format). In one example, the aGPS related data may be used to aid in the time to first fix by self-calculating a forward ephemeris using the data. In another example, the interface 430a may be used for mobile station based assistance to obtain precise time and/or receive orbital data or almanac for GNSS satellites enabling the integrated GNSS receiver and electronic horizon module 400 to lock to satellites more rapidly. In still another example, the interface 430a may be used for mobile station assisted assistance (e.g., communicating GNSS information to a remote server for the server to process the information into a position and relay the position to the vehicle, taking advantage of surveyed coordinates of a cell tower and/or the cell tower having a better satellite signal, etc.).

The block 432 may be implemented, in one example, as a detachable smart card. In one example, the block 432 may implement a subscriber identity module (SIM). The block 432 may contain subscriber information and phonebook data for a user. The block 432 generally allows the user to change vehicles including embodiments of the present invention while retaining their information. Alternatively, the user may change carriers (e.g., cellular phone service providers), while retaining the vehicle, simply by changing the block 432.

The controller 406a generally connects with the block 402, the block 406b and the block 408. The blocks 402 and 406a may connected by transmit and receive buses. The blocks 406a and 406b may be connected by transmit and receive buses. The block 406a may communicate GNSS position information receive from the block 402 to the block 404b (e.g., for map matching operations using the map data contained in one or more of the memory device connected to the block 406b). The block 406a may receive a signal (e.g., SLP) from the block 406b containing a command that vehicle sensor data and integrated sensor data (e.g., gyro) be suspended from transfer to the block 402. The block 408 may implement a CAN transceiver with discrete surface mounted devices. The CAN transceiver 408 generally provides a transceiver interface to the CAN bus of the vehicle via the CAN connector 444. However, other system busses and transceiver interfaces may be implemented accordingly to meet the design criteria of a particular implementation. The system 400 may also include a main power supply 446 that may receive a power supply from the vehicle (e.g., alternator, battery, etc.). In one example, the power supply 446 may be designed to work in vehicles with power supplies ranging from 12 to 48 Volts. However, other supply voltages may be implemented to meet the design criteria of a particular implementation. An optional back-up battery (not shown) may be implemented also to make the system 400 more robust.

Figure 5:
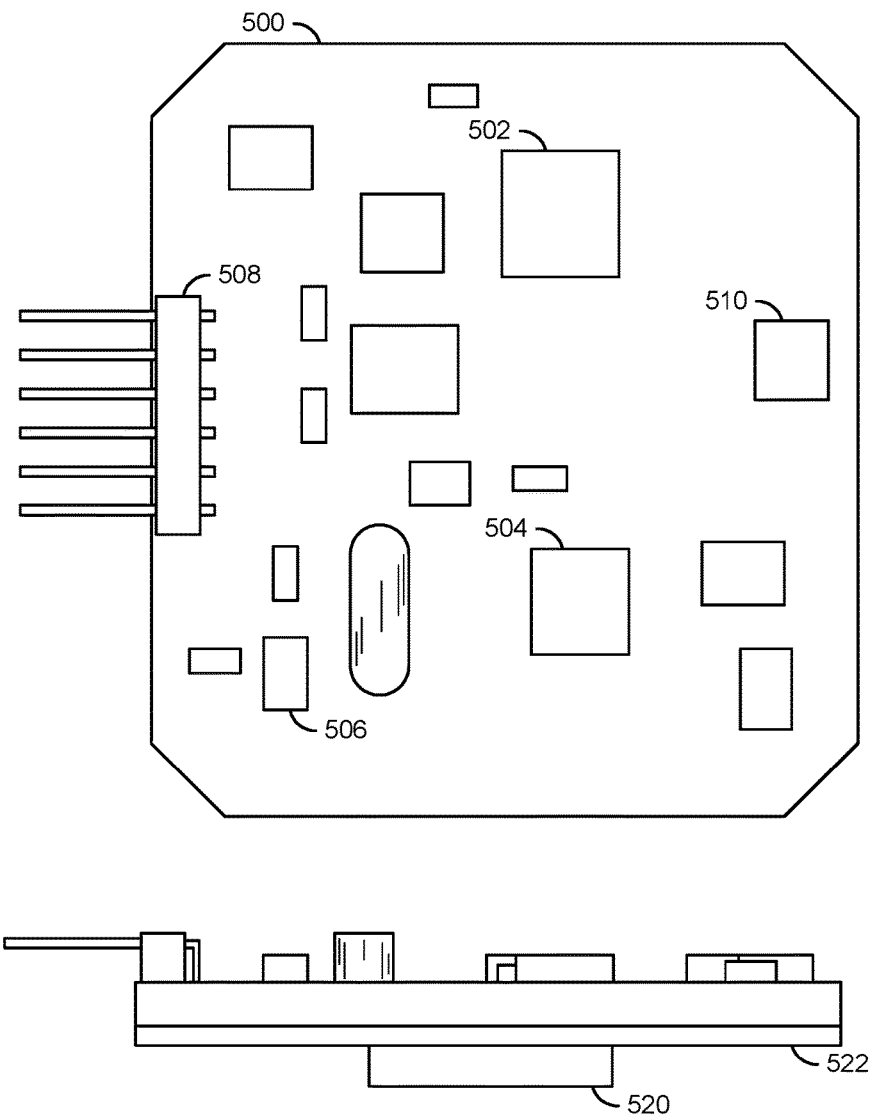
FIG. 5 is a diagram illustrating an example printed circuit board implementation of a vehicle positioning system in accordance with an example embodiment of the invention.

Referring to FIG. 5, a diagram of top and side views of a printed circuit board 500 illustrating an example implementation of a vehicle positioning system in accordance with an example embodiment of the invention is shown. In one example, the printed circuit board 500 may realize a credit card sized global navigation satellite system (GNSS) module configured to determine position information of a vehicle based upon (i) global navigation satellite system information received from a plurality of satellites, (ii) dead reckoning using sensor inputs of the vehicle and (iii) a correction signal generated through map matching. When the global navigation satellite system information is unavailable, the correction signal may be generated based upon pre-defined map data stored in a device on the printed circuit board 500 or communicated to the printed circuit board 500 from an external storage device. When the global navigation satellite system information is reacquired after being unavailable, communication of the vehicle sensor inputs to one or more of the devices on the printed circuit board 500 may be suspended for a predefined amount of time.

In an example, a first side of the printed circuit board 500 may comprise an integrated circuit (or chip) 502, an integrated circuit (or chip) 504, an integrated circuit (or chip) 506, and a connector 508. The integrated circuit 502 may comprise a GNSS chipset (e.g., u-blox LEA-6R, STMicrodevices Teseo III, etc.). The integrated circuit 504 may comprise a microcontroller (e.g., Renesas V850) or one or more processor cores. The integrated circuit 506 may comprise a CAN bus transceiver/microcontroller. The connector 508 may comprise a standard 6 or 8 pin automotive connector. In some embodiments, the first side of the printed circuit board 500 may further comprise an integrated circuit (or chip) 510. The integrated circuit 510 may comprise a multi-axis gyroscope. In some embodiments, the first side of the printed circuit board 500 may further comprise a video imaging sensor (not shown). A second side of the printed circuit board 500 may comprise a GNSS antenna 520 and a related ground plane 522.

Figure 6:
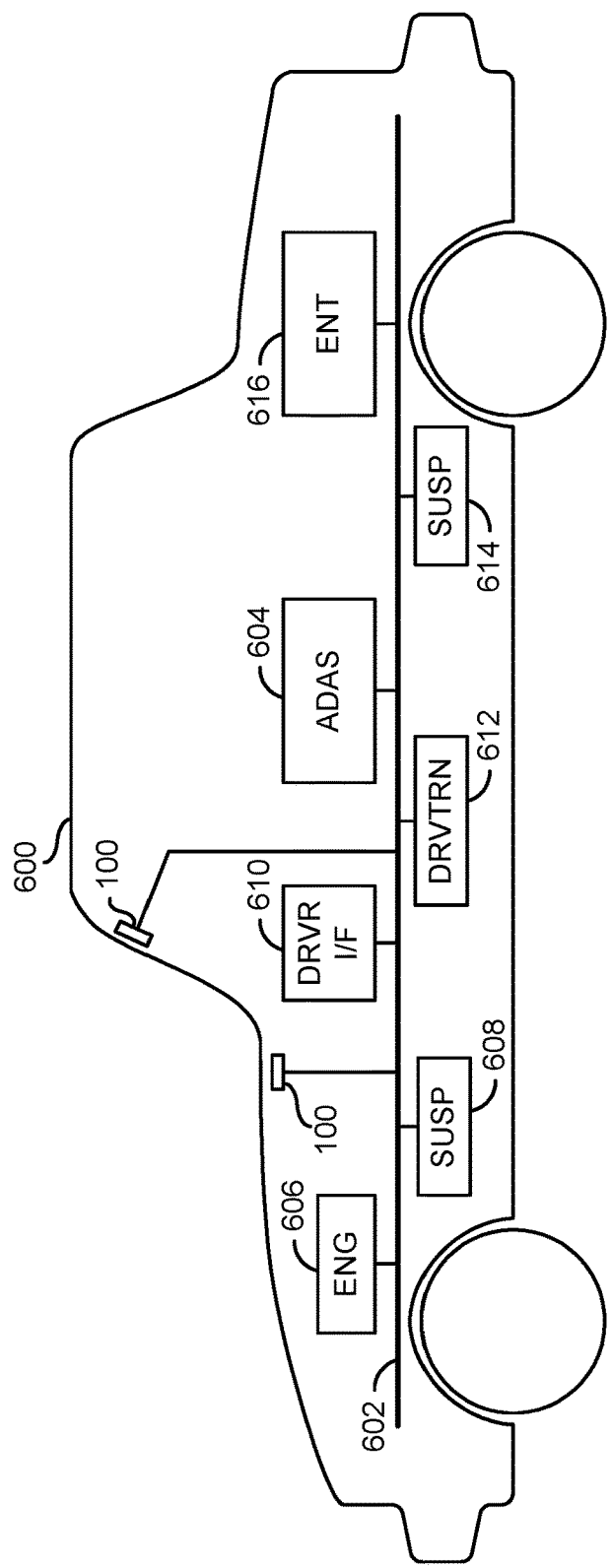
FIG. 6 is a diagram illustrating a vehicle incorporating the system of FIG. 1.

Referring to FIG. 6, a diagram is shown illustrating an example application of an integrated GNSS receiver and electronic horizon module 100 in accordance with an example embodiment of the invention. In one example, the integrated GNSS receiver and electronic horizon module 100 may be mounted in a vehicle 600. For example, the integrated GNSS receiver and electronic horizon module 100 may be mounted under a dashboard, against the windshield, in a rear package tray, or any other place in the vehicle where a view of the sky (e.g., through an RF permeable material) may be obtained. The vehicle 600 may further include a system bus 602 (e.g., a CAN bus, data bus, etc.), an advanced driver assistance system (ADAS) 604, and a number of sensors and/or actuators distributed around the vehicle. The term sensor generally refers to a device that generates a signal representative of a sensed condition (e.g., temperature, level, position, speed, etc.) or an inertial measurement (e.g., wheel click, gyro, etc.). The term actuator generally refers to a device that is configured to control a parameter or object in response to a control signal (e.g., solenoid, heater, lamp, wiper motor, blower motor, etc.). The sensors and/or actuators may include, but are not limited to, engine-related devices 606, front suspension related devices 608, driver interface devices 610, drive train related device 612, and rear suspension related devices 614. The bus 602 may also connect to entertainment related systems 616.

The integrated GNSS receiver and electronic horizon module 100, the sensors and/or the actuators may feed information to and receive control signals from the ADAS system 604. The integrated GNSS receiver and electronic horizon module 100 may provide information to the ADAS system 604 which may be used to control various systems of the vehicle 600. The information provided may enhance the performance of the ADAS system 604 in assisting the driver/operator. For example, information from the integrated GNSS receiver and electronic horizon module 100 may provide advanced information on local road conditions, topology, points of interest, etc. that may augment information already stored in the vehicle. The ADAS system 604 may provide information received from the integrated GNSS receiver and electronic horizon module 100 to the driver/operator and/or employ the information to alter one or more vehicle characteristics (e.g., drive train, suspension, steering, braking and stability control assistance, adaptive cruise control, lane departure warning, predictive lighting, curve warning, etc.).

The alterations made by the ADAS system 604 may be configured, for example, to increase fuel economy and/or safety of the vehicle. The integrated GNSS receiver and electronic horizon module 100 may further be used to relay information from the ADAS system 604 and/or sensors to a remote site or sites. For example, vehicle performance information along with vehicle location and driving parameters may be relayed to a remote site where the information may be used to update maps and/or driver assistance information. The updated maps and/or driver assistance information may then be sent back to the vehicle to update on-board performance and response parameters.

Referring to FIG. 7, a diagram illustrating an example data flow in accordance with an embodiment of the invention is shown. In various embodiments, the integrated GNSS receiver and electronic horizon module 100 may deliver data to multiple vehicle systems via a vehicle electronic systems data bus (e.g., CAN bus) 702. The data provided and/or utilized by the integrated GNSS receiver and electronic horizon module 100 may include but is not limited to information received from and/or based on sensors (e.g., gyros, ABS wheel, accelerometer, etc.) 704, and/or active safety applications 706, systems applications 708, driver information applications 710, efficiency applications 712, and service applications 714. The data provided and/or utilized by the integrated GNSS receiver and electronic horizon module 100 may also include satellite broadcasts 718, WiFi communications, cellular communications, etc.

The active safety applications 706 may include adaptive cruise control (ACC), side blind zone monitoring, lane assistance, adaptive headlights, and collision avoidance. The systems applications 708 may include navigation, compass, tracking, and time. The driver information applications 710 may include curve warning, speed information, speed limit sensor, school zone warning, etc. The efficiency applications 712 may include powertrain control, energy generation, predictive shifting, power management, etc. The services applications 714 may include local traffic, use based fees, regional information, advertising, etc.

In an example, the information provided by the integrated GNSS receiver and electronic horizon module 100 may include latitude, longitude, height, universal time clock (UTC), ground speed, heading, 8-point compass, DR mode (e.g., GNSS only, GNSS+DR, DR only), 3D acc, satellites in view, altitude, Hdop, Vdop, etc. In an example, the integrated GNSS receiver and electronic horizon module 100 adjusts a dead-reckoned vehicle position based on map data and provides a look ahead feature on a most probable path, as well as side roads. In one example, the vehicle position adjustment may allow dead-reckoning to be useful for distances approaching 1600 m and the look ahead feature may provide a range of 2500 m. However, other ranges and/or user customization may be provided accordingly. The look ahead feature may provide data including, but not limited to slope, curvature, map heading, road signs, stop signs, traffic lights, road speed, road accessability, etc. The particular data may be selected based on specifications of the particular implementation.

The navigation applications 708 may include, but are not limited to a map, a display, and software. The integrated GNSS receiver and electronic horizon module 100 may broadcast GNSS positional information on the CAN bus 702 enabling an accurate indication of location, direction and speed, without needing a separate antenna and GNSS chipset. In various embodiments, the integrated GNSS receiver and electronic horizon module 100 may convert heading into an 8 point compass and then publish that information on the CAN bus 702. However, any number of compass points may be implemented to meet the design criteria of a particular implementation. The compass application 708 provides a simple display, eliminating issues associated with location programming and magnetic compasses. The services application 714 may enable location based services to be provided using location data published on the CAN bus 702 by the integrated GNSS receiver and electronic horizon module 100.

The power management application 712 utilizes ADAS messages predicting the slope of the road ahead. Using the slope information, the power management application 712 can be programmed to turn-off fuel burning accessories (e.g., air conditioning, etc.) for a short time until the road levels out. The powertrain control application 712 utilizes slope and curvature information provided by the integrated GNSS receiver and electronic horizon module 100. Identifying the road slope and curvature information early, the integrated GNSS receiver and electronic horizon module 100 and the powertrain control application 712 can aid in shifting of multi-speed transmissions for a smoother ride for the driver.

The driver information application 710 may provide alerts for enhanced driver safety. For example, road curvature and slope information can be used with vehicle speed to warn drivers of dangerous road segments (e.g., steep grades, sharp curves, etc.).

Figure 8:
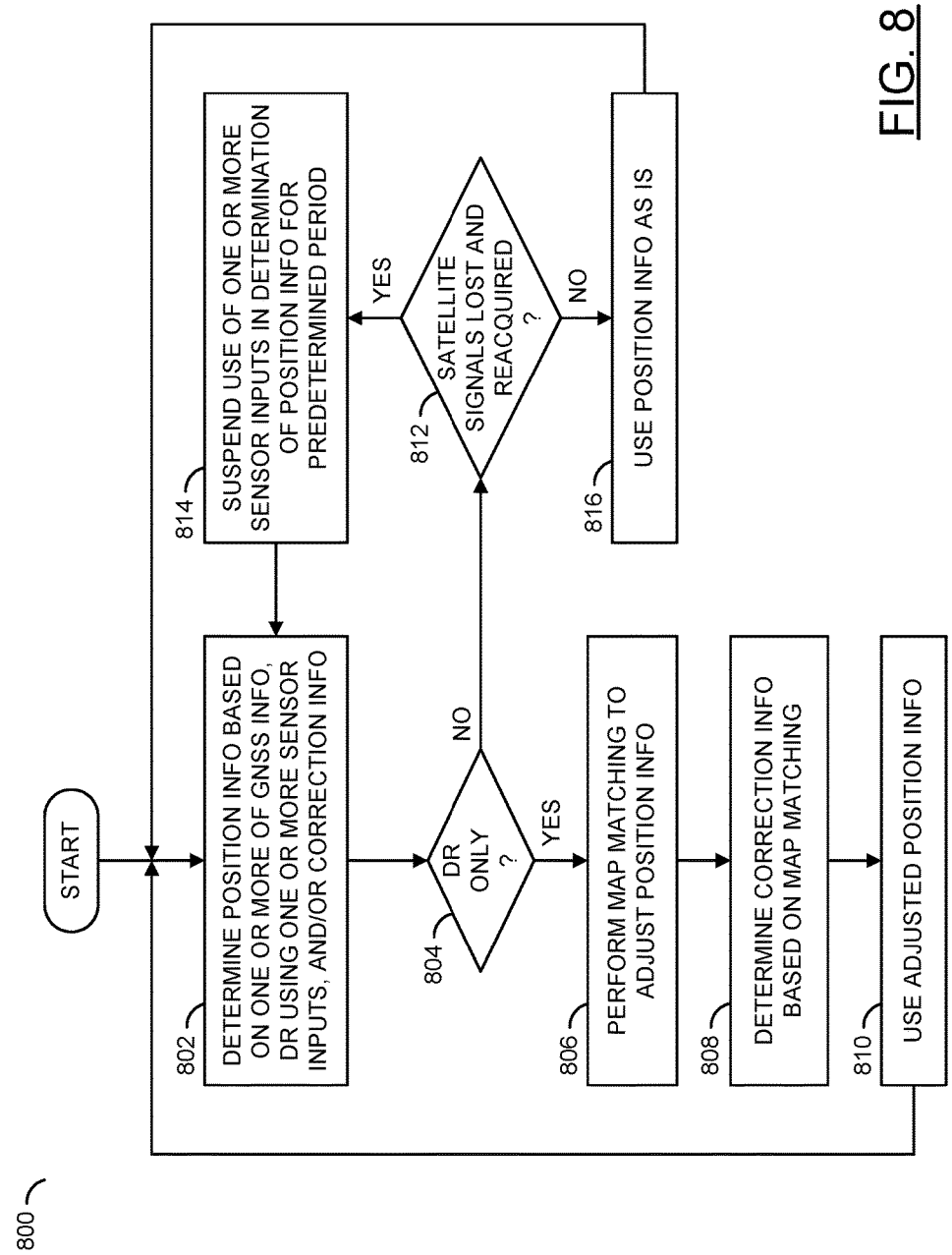
FIG. 8 is a flow diagram illustrating a process in accordance with an example embodiment of the invention.

Referring to FIG. 8, a flow diagram 800 is shown illustrating a process in accordance with an example embodiment of the invention. In one example, the process (or method) 800 may comprise a number of steps (or states) 802 to 816. In the step 802, the process 800 may determine position information based on one or more of GNSS information, dead reckoning (DR) using one or more sensor inputs, and/or correction information (e.g., based on map matching). The one or more sensor inputs may comprise motion and/or inertial sensor measurements. In an example, the position information may be determined using a GNSS chipset. The position information may comprise GNSS only, GNSS plus dead reckoning (DR) and/or DR-only information. In the step 804, the process 800 determines whether the position information comprises DR-only information.

If the position information is DR-only, the process 800 moves to the step 806. In the step 806, the process 800 performs map matching to adjust the dead-reckoned vehicle position information (e.g., received from the GNSS chipset) according to a centerline of a corresponding road (e.g., as indicated by map data corresponding to the vehicle location). In the step 808, the process 800 determines correction information (e.g., difference between the dead-reckoned vehicle position and the centerline of the road in the map data corresponding to the vehicle position). The correction information may be used to update a current relative (dead-reckoned) vehicle position (e.g., stored in the GNSS chipset). In the step 810, the process 800 uses the adjusted (corrected) position information as the current location. In a vehicle embodiment, the process 800 may broadcast the adjusted (corrected) vehicle position data to other systems of the vehicle. The process 800 may then return to the start.

If the position information (e.g., received from the GNSS chipset) in the step 802 is not DR only, the process 800 moves from the step 804 to the step 812. In the step 812, the process 800 determines whether enough satellite signals have been reacquired after having been unavailable. If the satellite signals have just been reacquired after being unavailable, the process 800 moves to the step 814 where the sensor data is suspended from being used to determined the position information (e.g., communication of sensor data to GNSS chipset is temporarily suspended). If the satellite signals have not been reacquired after being unavailable, the process 800 moves to the step 816 where the vehicle position information is used as is, and the process 800 moves to the start.

Figure 9:
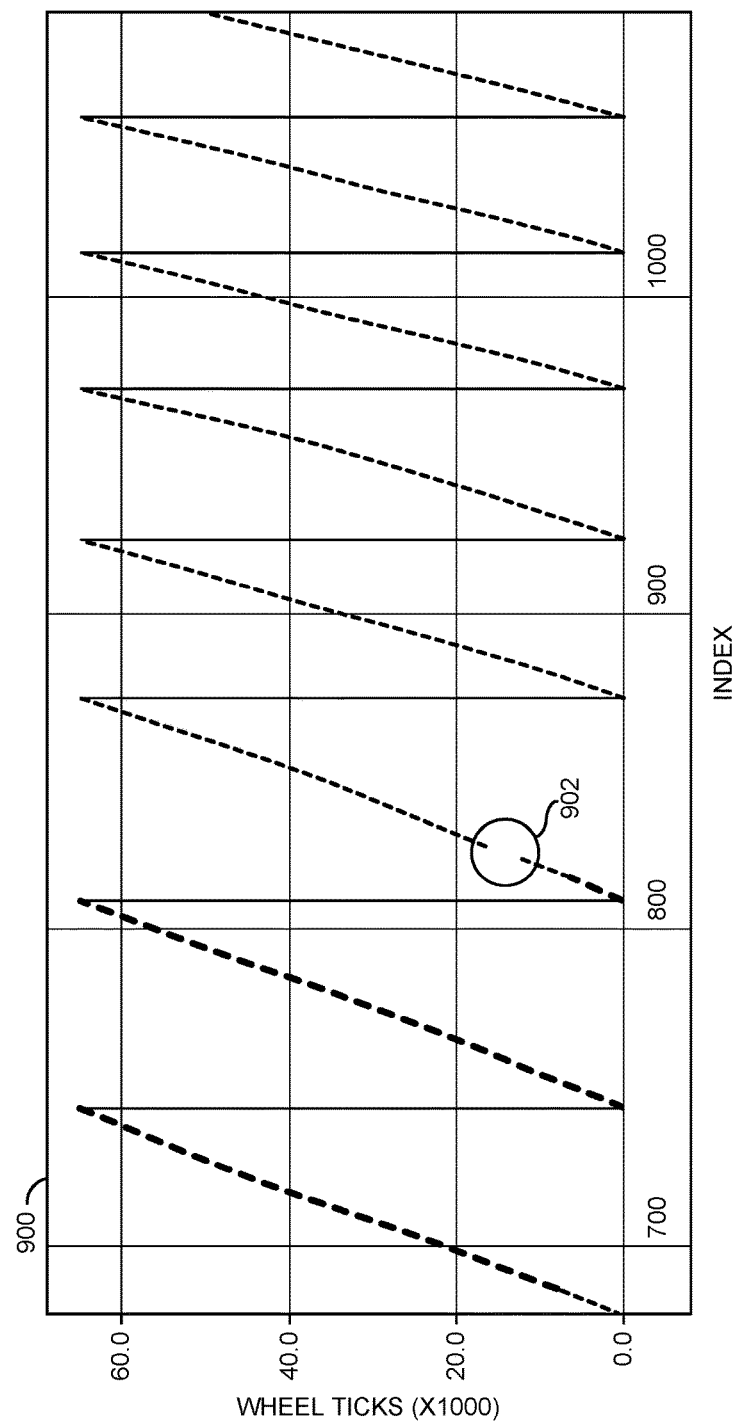
FIG. 9 is a diagram illustrating a temporary suspension of sensor data utilization in accordance with an example embodiment of the invention.

Referring to FIG. 9, a diagram of a graph 900 is shown illustrating a temporary suspension of wheel tick sensor data utilization in accordance with an example embodiment of the invention. The graph 900 generally shows wheel tick counts being used to determine a vehicles position. A thicker dashed line illustrates a period where DR only position information is generated (e.g., due to lack of satellite data). When satellite information becomes available after a period of being unavailable, utilization or reception of vehicle sensor data, like the wheel ticks data illustrated in the graph 900, may be temporarily interrupted (as shown by the circle 902) to force reliance on only received satellite signals in order to eliminate any relative positioning error that may have accumulated within the dead reckoned position information.

A method of augmenting GNSS/DR determination is disclosed. The method includes transitioning from the GNSS/DR system using mainly dead reckoning (DR)+map data (with no satellite signal) to the GNSS/DR system moving back to using mainly satellite signals. Using DR+map data does a nice job of laterally positioning a vehicle in the road (e.g., side to side), but does not compensate for error in a longitudinal position of the vehicle after an extended period of time with only DR. The longitudinal error can be corrected when the satellite signals are recovered, but the recovery is generally slow due to conventional systems relying on vehicle sensor inputs as a main basis for positional calculations. The GNSS/DR module in accordance with an embodiment of the invention may be configured (e.g., through software or firmware) to suspend vehicle sensor inputs to the GNSS/DR module for a short time during the transition from DR-only to GNSS+DR position determination. The suspension of vehicle sensor inputs to the GNSS/DR module forces the GNSS/DR module to more quickly recover by relying mainly on the satellite information rather than motion and/or inertial sensor measurements.

The functions and structures illustrated in the diagrams of FIGS. 1-9 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), SoCs (system-on-chips), MCM (multi-chip module), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of enhancing global navigation satellite system performance comprising:
   determining position information based upon (i) global navigation satellite system information, (ii) dead reckoning using one or more sensor inputs, and (iii) a correction signal;
   when said global navigation satellite system information is unavailable, adjusting said position information and generating said correction signal based upon pre-defined map data; and
   when said global navigation satellite system information is reacquired after being unavailable, suspending said dead reckoning for a predefined amount of time.

2. The method according to claim 1, further comprising: accessing a map database to obtain said predefined map data based upon said position information.

3. The method according to claim 1, wherein:
   said one or more sensor inputs are communicated from sensor outputs of a vehicle via a data bus of said vehicle; and
   said position information comprises a location of said vehicle.

4. The method according to claim 3, wherein communication of said vehicle sensor outputs via said vehicle data bus to said one or more sensor inputs is interrupted for said predefined amount of time when said global navigation satellite system information is reacquired after being unavailable.

5. The method according to claim 3, wherein said vehicle data bus comprises a controller area network.

6. The method according to claim 3, wherein said vehicle sensor outputs are fed to at least one sensor input of a global navigation satellite system chipset configured to generated said position information based on signals received from a plurality of satellites, said dead reckoning, and said correction signal.

7. The method according to claim 6, wherein said global navigation satellite system chipset is further configured to provide an indication of when said global navigation satellite system information is unavailable and when said global navigation satellite system information is reacquired after being unavailable.

8. The method according to claim 1, wherein adjusting said position information comprises shifting a location indicated by said position information to a centerline of a road.

9. The method according to claim 1, wherein generating said correction signal comprises determining a correction needed to shift a location indicated by said position information to a centerline of a road.

10. A non-transitory computer readable storage medium containing processor executable instructions which, when executed by a processor of a global navigation satellite system receiver, cause the processor to perform the steps of:
   determining position information based upon (i) global navigation satellite system information received from a plurality of satellites, (ii) dead reckoning using one or more sensor inputs, and (iii) a correction signal;
   when said global navigation satellite system information is unavailable, adjusting said position information and generating said correction signal based upon pre-defined map data; and
   when said global navigation satellite system information is reacquired after being unavailable, suspending said dead reckoning for a predefined amount of time.

11. An apparatus comprising:
   a first circuit configured to determine position information based upon (i) global navigation satellite system information, (ii) dead reckoning using one or more sensor inputs, and (iii) a correction signal; and
   a second circuit configured to (i) generate said correction signal based upon pre-defined map data and (ii) temporarily suspend communication of said one or more sensor inputs of said vehicle to said first circuit when said global navigation satellite system information is reacquired after being unavailable.

12. The apparatus according to claim 11, wherein said map data comprises one or more of road information for an entire region, road location information, road curvature information, road surface information, road slope information, road lane number, speed limits, tunnel locations, and tunnel lengths.

13. The apparatus according to claim 11, wherein said map data is limited to road information for areas where satellite information is known to be unavailable.

14. The apparatus according to claim 11, wherein said map data is limited to location and length information for road sections with tunnels.

15. The apparatus according to claim 11, wherein said second circuit is further configured to (i) receive said one or more sensor inputs from a vehicle data bus, (ii) communicate said one or more sensor inputs received from said vehicle data bus to said first circuit when said global navigation satellite system information is available or has become unavailable, and (iii) temporarily suspend communication of said one or more sensor inputs received from said vehicle data bus to said first circuit when said global navigation satellite system information is reacquired after having been unavailable.

16. The apparatus according to claim 11, wherein said second circuit is further configured to temporarily suspend communication of said one or more sensor inputs to said first circuit when position information received from said first circuit changes from dead-reckoning-only to satellite-plus-dead-reckoning.

17. The apparatus according to claim 11, wherein said first circuit and said second circuit are disposed on a single printed circuit board.

18. The apparatus according to claim 11, wherein said first circuit and said second circuit are disposed on separate printed circuit boards.

19. The apparatus according to claim 11, wherein said first circuit and said second circuit are disposed on a first side of a single printed circuit board and an antenna configured to receive satellite signals is disposed on a second side of said printed circuit board.

20. The apparatus according to claim 11, wherein said second circuit comprises a processor and a non-transitory computer readable storage medium storing (i) said pre-defined map data and (ii) computer executable instructions, which when executed by said processor cause said processor to (i) generate said correction signal based upon said pre-defined map data and (ii) temporarily suspend communication of said one or more sensor inputs to said first circuit when said global navigation satellite system information is reacquired after being unavailable.

* * * * *